(12) United States Patent
Furuta et al.

(10) Patent No.: US 8,409,304 B2
(45) Date of Patent: Apr. 2, 2013

(54) CETANE-IMPROVING COMPONENT FOR DIESEL FUELS AND DIESEL FUELS CONTAINING IT

(75) Inventors: Satoshi Furuta, Toda (JP); Frédéric Tort, Brignais (FR); Daniel Meyet, Neuville-les-Dames (FR)

(73) Assignee: Total France, Puteaux (FR)

( * ) Notice: Subject to any disclaimer, the term of this patent is extended or adjusted under 35 U.S.C. 154(b) by 0 days.

(21) Appl. No.: 13/467,226

(22) Filed: May 9, 2012

(65) Prior Publication Data

US 2012/0216452 A1 Aug. 30, 2012

Related U.S. Application Data

(62) Division of application No. 12/158,272, filed as application No. PCT/FR2006/002806 on Dec. 20, 2006, now abandoned.

(30) Foreign Application Priority Data

Dec. 21, 2005 (FR) ..................................... 05 13034
Jan. 10, 2006 (FR) ..................................... 06 00184

(51) Int. Cl.
*C10L 1/19* (2006.01)
(52) U.S. Cl. ............................................ 44/308; 44/388
(58) Field of Classification Search .................... 44/308, 44/388
See application file for complete search history.

(56) References Cited

U.S. PATENT DOCUMENTS

| | | | |
|---|---|---|---|
| 4,695,411 | A | 9/1987 | Stern et al. |
| 4,920,691 | A | 5/1990 | Fainman |
| 5,389,113 | A | 2/1995 | Demmering et al. |
| 6,017,369 | A | 1/2000 | Ahmed |
| 2005/0160663 | A1 | 7/2005 | Valentine |
| 2006/0213118 | A1 | 9/2006 | Mittelbach et al. |

FOREIGN PATENT DOCUMENTS

| | | |
|---|---|---|
| DE | 40 40 317 A1 | 6/1992 |
| EP | 0 860 494 A1 | 8/1998 |
| EP | 1 484 385 A1 | 8/2004 |
| FR | 2 498 622 A1 | 7/1982 |
| GB | 2 090 611 A1 | 7/1982 |
| GB | 2 090 612 A1 | 7/1982 |
| GB | 2090611 * | 7/1982 |
| GB | 2 099 449 A1 | 12/1982 |
| GB | 2099449 * | 12/1982 |
| JP | 2005089577 * | 4/2005 |
| WO | 2005/010130 A1 | 2/2005 |

OTHER PUBLICATIONS

Gerhard Knothe, et al., "Cetane numbers of branched and straight-chain fatty esters determined in an ignition quality tester" Elsevier Science Ltd., Fuel 82 (2003) 971-975.

International Search Report (PCT/ISA/210) relating to International Application No. PCT/FR2006/002806, having a mailing date of Jun. 21, 2007, 6 pgs.

Written Opinion of the International Searching Authority (PCT/ISA/237) relating to International Application No. PCT/FR2006/002806, having a mailing date of Jun. 21, 2007, 7 pgs.

* cited by examiner

*Primary Examiner* — James Goloboy
*Assistant Examiner* — Chantel Graham
(74) *Attorney, Agent, or Firm* — Marsh Fischmann & Breyfogle LLP

(57) ABSTRACT

Cetane improver for diesel fuels, characterized in that it comprises at least one ester of stearic acid, selected from the esters of linear or branched monoalcohols containing 1 to 6 carbon atoms: a) added in the pure state to a mixture of at least one vegetable or animal oil ester in crude or partially hydrogenated form b) or else included in a mixture of esters of one or more vegetable and/or animal oils, in crude or partially hydrogenated form, the mixtures of saturated or unsaturated esters being such that the ratio by mass of the amount of stearic ester(s) to the total sum of the amounts of unsaturated esters present in the vegetable or animal oil esters varies from 1% to 12%, and the unsaturated fatty acid esters being esters of mono or polyunsaturated acids containing at least 18 carbon atoms with monoalcohols.

20 Claims, No Drawings

CETANE-IMPROVING COMPONENT FOR DIESEL FUELS AND DIESEL FUELS CONTAINING IT

RELATED APPLICATIONS

This application claims priority as a divisional application of U.S. patent application Ser. No. 12/158,272, filed Jun. 19, 2008, which is a 371 filing of International Application No. PCT/FR2006/002806, filed Dec. 20, 2006. Each of these applications is incorporated herein by reference in its entirety.

FIELD OF THE INVENTION

The present invention relates to a component which improves cetane without degrading the performance under cold conditions and the oxidation stability of diesel fuels, as well as to diesel fuels containing this component. It relates more particularly to the incorporation into diesel fuels of components deriving from products of vegetable or animal origin.

TECHNOLOGICAL BACKGROUND

Fuels containing vegetable oil derivatives have a reduced emission level and an increased biodegradability, but they habitually demonstrate a very high oxidation sensitivity and show very poor properties under cold conditions. Despite these drawbacks, sales of fuels containing these derivatives have increased significantly in recent years as the production of these derivatives becomes more competitive with conventional fuels derived from crude oil. In particular, the production of such fuels permits a more positive view of the future as oil reserves diminish. However, the poor properties of these components under cold conditions and their high oxidation sensitivity have for a long time constituted factors limiting their use in high concentrations in diesel fuels, as there is a risk that their physical and chemical characteristics will jeopardize the satisfactory operation of commercial engines. Taking account of these engines, it is at present difficult to use these derivatives at levels exceeding 5% in diesel fuels and obtain optimum efficiency.

These vegetable oil derivatives are often products of the transesterification of vegetable or animal oil triglycerides. They have a high cetane number corresponding to a good performance of the fuel upon combustion. For these derivatives, a cetane number of at least 47 is required according to United States standards (ASTM D 6751) and 51 in certain European countries (such as Germany for example). Since cetane numbers correlate with low nitrogen oxide emissions, the addition of these products can be very significant for the production of diesel fuels to which products obtained from vegetable and animal oils have been added.

G. Knothe et al., Fuel 82, 971-975 (2003) gives the cetane numbers of esters of many fatty acids such as palmitic acid, stearic acid, oleic or linoleic acid and in particular the beneficial effect of increasing the length and the saturated character of the chain on the cetane number, as is the case for esters of palmitic acid and stearic acid. It is observed moreover, that the linear or branched character of the ester has no effect.

In European application EP 1484385, a biofuel is described containing 100% by weight of a mixture of esters of palm oil, this mixture having a low pour point, particularly suitable for cold countries without addition of additives. This biofuel is produced by esterification of a mixture of C18 (stearic), C18:1 (oleic) and C18:2 (linoleic) fatty acids by methanol or ethanol, followed by the fractional distillation of the methyl and ethyl esters, finally crystallization. The biofuel is prepared by mixing these fractions originating from the distillation of palm oil. It is used as a fuel, on environmental principles, as a substitute for diesel fuels, obtained from palm oil and standard mixtures of palm oil esters.

Olefinic fatty acid esters contain more than 16 carbon atoms and in particular methyl esters are known for their good properties under cold conditions but also for their high oxidation sensitivity. Moreover, although they have the advantage of high cetane numbers, saturated fatty acid esters with up to 18 carbon atoms are known for their tendency to deteriorate the flow properties of biodiesels.

SUMMARY OF THE INVENTION

It was found that among these esters of saturated fatty acids the addition of at least one saturated acid ester with a carbon chain having at least 16 carbon atoms, in particular at least one stearic acid ester, hereafter called a stearic ester, in a particular concentration in a diesel fuel, was able not only to improve the cetane number of this fuel but to stabilize its oxidation resistance, without significantly deteriorating its performance under cold conditions.

The present invention relates to a cetane-improving and oxidation-stabilizing component for diesel fuels, comprising at least one stearic ester chosen from esters of linear or branched monoalcohols containing 1 to 6 carbon atoms a) in pure state, added to a mixture of at least one vegetable or animal oil ester in crude or partially hydrogenated form b) or included in a mixture of esters of one or more vegetable and/or animal oils in crude or partially hydrogenated form, the mixtures of saturated and unsaturated esters being such that the ratio by mass of the level of stearic ester(s) to the sum of the levels of unsaturated esters present in the esters of vegetable or animal oils varies from 1 to 12% by weight, and the esters of unsaturated fatty acids being esters of unsaturated mono- or polyacids containing at least 18 carbon atoms, and of monoalcohols.

DETAILED DESCRIPTION OF EMBODIMENTS

In the remainder of the present description, the reference to vegetable or animal oil stearic esters will cover the esters resulting from the esterification of vegetable and animal oils, whether totally or partially hydrogenated, extracted or not. The framework of the present invention will not be exceeded if the stearic acid ester were used in pure state, optionally in a mixture with at least one ester of an unsaturated linear acid having more than 16 carbon atoms.

The component is used in a concentration such that the stearic esters contribute to the improvement of the cetane number without deteriorating the performance of the fuel under cold conditions and while improving the oxidation stability of the hydrocarbons.

The ratio by mass of the esters [stearic ester(s)/esters of unsaturated fatty acid(s) having 18 carbon atoms and more] generally varies from 1 to 12%, and, preferably, is comprised between 5 and 9.6% and more preferably between 7 and 9.0%.

The stearic ester is advantageously chosen from the esters of linear or branched monoalcohols containing 1 to 6 carbon atoms. In particular methyl or ethyl esters, or also n-propanol, isopropanol, n-butanol or tert-butanol esters, and more particularly methyl or ethyl esters of stearic acid are preferred.

The stearic ester can be of natural or synthetic origin. Stearic esters are present in all esters of vegetable or animal oils. In particular, it may have come from partial or total hydrogenation of esters of vegetable or animal oils with a high level of unsaturated esters of C18 fatty acids, preferably linear, such as the esters of oleic, linoleic and linolenic acids. The stearic ester can be introduced into a fuel as part of an ester of a vegetable or animal oil or as a part resulting from the mixing of several esters of vegetable and/or animal oils. The scope of the invention will not be exceeded if, instead of using the products resulting from crude esterification, each ester contained were refined and/or separated by type of esterified acid and these esters of acids were mixed in the proportions required for the implementation of the invention in fuel.

Among the other esters present in the mixtures, the unsaturated esters of acids containing 18 carbon atoms and more, and in particular the esters of mono- or polyunsaturated acids containing 18, 20 or 22 carbon atoms, are preferred mixed with the stearic esters, due to their beneficial effect on the properties of diesel fuels under cold conditions: they are effective for moderating the negative effect of the stearic esters on these properties. The preferred unsaturated esters are the esters of oleic, linoleic or linolenic acids. The esters of unsaturated fatty acids can be of natural or synthetic origin. They are present in the esters of vegetable or animal oils in concentrations that can vary according to the type of esterified oil. The stearic acid ester present in these mixtures makes it possible to limit the well known oxidation of these unsaturated esters and to stabilize this effect. The increase in the cetane number and the improved operability of the fuels under cold conditions are optimum when there is an appropriate combination of stearic ester with esters of unsaturated acids containing at least 18 carbon atoms, preferably linear.

It is well known that vegetable or animal oils contain triglycerides of monocarboxylic fatty acids. The number and nature of the acid residues in the composition of the glycerides define the type of each of these oils. The mixtures of esters can optionally come from a mixture of esters of vegetable or animal oils such as in particular esters of colza oils (methyl or ethyl ester of colza for example), palm oil esters (methyl or ethyl palm ester for example), pine oil esters (methyl or ethyl pine ester for example), soya oil esters (methyl or ethyl soya ester for example), sunflower oil esters (methyl or ethyl sunflower ester for example), maize oil esters (methyl or ethyl maize ester for example), safflower oil esters (methyl or ethyl safflower ester for example), cotton oil esters (methyl or ethyl cotton ester for example), coriander oil esters (methyl or ethyl coriander ester for example), mustard oil esters (methyl or ethyl mustard ester for example), tallow oil ester (methyl or ethyl tallow ester for example) and all other esters containing stearic esters and/or esters of acids containing at least 18 unsaturated carbon atoms.

The esterification of triglycerides of fatty acids present in these oils can be carried out according to the known methods. In particular it can be carried out by alcoholysis, by means of the alcohols mentioned previously, as described by J.-C. Guibet et al., Carburants et moteurs, Ed. Technip Paris, or according to European patent application EP 860 494.

Within the framework of the present invention, it is possible to use esters of several vegetable and/or animal oils in a mixture to introduce the necessary quantities of stearic esters and esters of unsaturated fatty acids having at least 18 carbon atoms. The mixture can advantageously comprise two, three or more esters of different oils. It is well understood that suitable mixtures are limited to those which make it possible to arrive at a value of the ratio by mass [stearic ester(s)/sum of the esters of C18 and above unsaturated acids] comprised between 1 and 12%, preferably varying from 5 to 9.6% and even more advantageously from 7 to 9%.

The present invention also relates to the use of a cetane-improving and oxygen- stabilizing component for diesel fuels, as defined previously, for the preparation of a diesel fuel with an improved cetane number without deteriorating the low-temperature and oxidation stability properties of said fuel, starting from a mixture of esters of vegetable and/or animal oils.

Another subject of the present invention also relates to a diesel fuel comprising:
  at least one hydrocarbon from distillates with a boiling point varying from 180 to 350° C.,
  at least one component comprising at least one saturated ester having more than 16 carbon atoms, preferably comprising at least one stearic ester chosen from the esters of linear or branched monoalcohols containing 1 to 6 carbon atoms:
  a) in pure state, mixed with at least one ester of an unsaturated linear fatty acid having at least 18 carbon atoms,
  b) in pure state, added to a mixture of at least one ester of a vegetable or animal oil in crude or partially hydrogenated form
  c) or included in a mixture of one or more esters of vegetable and/or animal oils in crude or partially hydrogenated form,
  the mixtures of saturated and unsaturated esters being such that the ratio by mass of the level of stearic ester(s) to the sum of the levels of unsaturated esters present in the esters of animal or vegetable oils varies from 1 to 12%, the esters of unsaturated fatty acids being esters of unsaturated mono- or polyacids containing at least 18 carbon atoms, and esters of monoalcohols, and
  the stearic acid ester level in said fuel being at least 0.5% by mass.

The hydrocarbons have come from oil distillation cuts, but also from biomass, essentially paraffinic hydrocarbon mixtures resulting from the conversion of gas into hydrocarbons or from any other process allowing all or some of such mixtures or a mixture of these various sources of hydrocarbons to be obtained.

The esters of saturated or unsaturated fatty acids necessary for the realization of the invention were defined earlier in the present description.

If the stearic ester is introduced into the fuel in pure state or in any other form whatever, its concentration will have to be kept below or equal to 2.4% by mass.

When the stearic ester is introduced into the fuel, mixed with other compounds such as for example the esters of vegetable or animal oils, ester mixtures of one or more vegetable and/or animal oils, the stearic ester level of the fuel can vary between 0.5 and 2.4%, preferably between 0.5 and 1.2% and the ratio by mass stearic ester/sum of the esters of unsaturated acids present in the fuel can vary between 1 and 12%, preferably between 5 and 9.6% by mass and more particularly between 7 and 9% by mass.

Mixtures of esters of several vegetable and/or animal oils are advantageously used to achieve the optimum composition of stearic esters/unsaturated esters comprising at least 18 carbon atoms. It is well understood that the optimum mixtures are limited to those which make it possible to achieve, according to the quantity of stearic ester present, a final level of stearic ester which is always below or equal to 2.4% weight, a value of the ratio by mass [stearic ester/sum of the ester(s) of unsaturated acids] comprised between 1 and 12% and preferably comprised between 5 and 9.6% and more particularly between 7 and 9%.

Preferably, whatever the composition of the component, the stearic ester level will advantageously be comprised between 0.5 and 1.2% by weight in the fuel and the ratio by mass [stearic ester/sum of the ester(s) of unsaturated acids] is comprised between 7 and 9%.

When the stearic esters are in the presence of strong concentrations of at least one second C16 saturated acid ester, the palmitic ester, this must be taken into account. In fact, the effects of these esters are close to those of stearic esters, in particular regarding the performance of the fuel under cold conditions. The Applicant thus observed that the sum of the stearic esters and the palmitic esters, i.e. the sum of the esters of saturated C16 and C18 acids, was a factor limiting the mixtures of esters of vegetable oil in diesel fuels. Thus, the quantity of saturated C16 and C18 esters cannot exceed 10% by weight of the fuel. By exploiting the combination of esters of vegetable and/or animal oils while still respecting the conditions described above, the quantity of esters of vegetable oils contained in the fuels can thus be increased very substantially, up to over 10% by mass, without being limited to colza oil esters only. Thus it is possible in a preferred fashion, to introduce esters of palm, soya and sunflower oils into the fuels at higher concentrations.

In particular, the concentration of the compound in the fuel can be fixed above 10% and even 20%, to increase the cetane number while still maintaining the oxidation stability of the fuels with good flow properties and filterability under cold conditions. In particular it makes it possible for filterability additives, in particular EVAs (polyethylenevinylacetates) to have a beneficial effect on the filterability temperature of the resulting fuel.

In order to give the fuel all the properties necessary for the satisfactory operation of vehicle engines, said fuel can of course also contain other additives intended to improve the properties under cold conditions, the flow or filterability, but also anti-foaming, lubricity, conductivity, anticorrosion, detergent and de-emulsification additives that no person skilled in the art would forget to include, as well as bactericides.

The fuel can have a low sulphur level, preferably less than 500 ppm sulphur, advantageously less than 100 ppm.

The following examples are given to illustrate the present invention but in no way limit it.

of different types chosen from the methyl esters of colza (EMC), soya (EMS) and palm (EMP) and the influence of these mixtures introduced in different concentrations into a diesel of type EN590 (GO1) and a heating oil (FOD1) the characteristics of which are given in Table I below.

TABLE I

|  | GO | FOD |
|---|---|---|
| FLT (° C.) | −4 | −5 |
| Cloud point (° C.) | −12 | −18 |
| Transition point (° C.) | −4 | −6 |
| IP 387 |  | 1.01 |
| MV15 | 0.8327 | 0.8388 |
| Sulphur content ppm | 39.8 | 1740 |
| Viscosity at 40° C. mm/s | 2.725 | 2.451 |
| Calculated cetane | 50.1 | 48.5 |
| Monoaromatics % | 22.7 | 21.2 |
| Diaromatics % | 6.2 | 6.9 |
| Polyaromatics % | 0.6 | 0.6 |
| D86 distillation Initial boiling point | 167.6 | 168 |
| 5% | 190.1 | 188.5 |
| 10% | 203 | 196.3 |
| 20% | 224.7 | 210.8 |
| 30% | 244.9 | 227 |
| 40% | 260.7 | 242.3 |
| 50% | 274.5 | 258.9 |
| 60% | 288.1 | 274.3 |
| 70% | 301.7 | 290.7 |
| 80% | 317.1 | 310.1 |
| 90% | 337.4 | 333.7 |
| Final boiling point | 356 | 356.3 |

Table II summarizes the respective quantities in the envisaged different esters of saturated C16 and C18 acid esters and unsaturated fatty acids having at least 18 carbon atoms.

TABLE II

|  | C16 | C18 | C18:1 | C18:2 | C18:3 | C20 | C20:1 | C22 | Sat | Unsat | Sat/Unsat |
|---|---|---|---|---|---|---|---|---|---|---|---|
| MP | 44 | 6 | 38 | 10 | 0.5 | 0.5 | 0 | 0 | 51.5 | 48.5 | 1.061856 |
| MC | 5 | 2 | 59 | 21 | 9 | 0.4 | 1 | 0.5 | 7.9 | 91 | 0.086813 |
| MT | 6 | 5 | 19 | 68 | 0.5 | 0.5 | 0.5 | 0.5 | 12 | 88 | 0.136364 |
| MSoya | 10 | 4 | 23 | 53 | 8 | 0.5 | 0.5 | 0.5 | 15 | 84.5 | 0.177515 |

EXAMPLES

Example 1

The present example serves to demonstrate the feasibility of the introduction of mixtures of two esters of vegetable oils The mixtures according to the invention were produced by varying the respective concentrations of colza methyl ester and palm methyl ester and by varying the concentration of the mixture in each of the two hydrocarbons. Each test will be labelled Xi for the GO and Yi for the FOD as described in Table III below.

TABLE III

| Hydrocarbon | EMP | EMC | sat C18 % weight | sat C16 + 18 % weight | sat C18/unsat C18 % mass | FLT Additive content Without | 200 ppm | 400 ppm |
|---|---|---|---|---|---|---|---|---|
| Diesel |  |  |  |  |  |  |  |  |

TABLE III-continued

| Hydrocarbon | EMP | EMC | sat C18 % weight | sat C16 + 18 % weight | sat C18/unsat C18 % mass | FLT Without | Additive content 200 ppm | 400 ppm |
|---|---|---|---|---|---|---|---|---|
| 100 | 0 | 0 | 0 | 0 | 0 | −4 | −14 | |
| 90 | 0 | 10 | 0.2 | 0.79 | 2.25 | −4 | −13 | |
| 90 | 10 | 0 | 0.6 | 5.15 | 12.37 | −2 | −10 | |
| 90 | 3 | 7 | 0.3 | 2.1 | 5.28 | −4 | −14 | |
| 90 | 7 | 3 | 0.5 | 3.84 | 9.33 | −3 | −14 | |
| 80 | 0 | 20 | 0.4 | 1.58 | 2.25 | −3 | −13 | |
| 80 | 10 | 10 | 0.8 | 5.94 | 7.31 | −3 | −11 | |
| 80 | 16 | 4 | 0.989 | 8.56 | 10.4 | −2 | −9 | |
| 80 | 20 | 0 | 1.2 | 10.3 | 12.37 | −3 | −8 | |
| 70 | 0 | 30 | 0.6 | 2.37 | 2.25 | −3 | −13 | |
| 70 | 21 | 9 | 1.4 | 11.5 | 9.33 | −2 | −7 | −8 |
| 70 | 24 | 6 | 1.6 | 12.8 | 10.35 | −3 | −7 | −3 |
| 70 | 30 | 0 | 1.8 | 15.5 | 12.37 | −3 | −5 | −2 |
| FOD | | | | | | | | |
| 100 | 0 | 0 | 0 | 0 | 0 | −5 | −16 | |
| 90 | 0 | 10 | 0.2 | 0.79 | 2.25 | −5 | −16 | |
| 90 | 10 | 0 | 0.6 | 5.15 | 12.37 | −4 | −15 | |
| 90 | 3 | 7 | 0.3 | 2.1 | 5.28 | −6 | −17 | |
| 90 | 7 | 3 | 0.5 | 3.84 | 9.33 | −5 | −16 | |
| 80 | 0 | 20 | 0.4 | 1.58 | 2.25 | −4 | −17 | |
| 80 | 10 | 10 | 0.8 | 5.94 | 7.31 | −5 | −15 | |
| 80 | 16 | 4 | 0.989 | 8.56 | 10.4 | −5 | −13 | |
| 80 | 20 | 0 | 1.2 | 10.3 | 12.37 | −5 | −11 | |
| 70 | 0 | 30 | 0.6 | 2.37 | 2.25 | −4 | −16 | |
| 70 | 21 | 9 | 1.4 | 11.5 | 9.33 | −5 | −10 | −9 |
| 70 | 24 | 6 | 1.6 | 12.8 | 10.35 | −5 | −11 | −9 |
| 70 | 30 | 0 | 1.8 | 15.5 | 12.37 | −6 | −8 | −8 |

In this table the levels of saturated C18 and saturated C16+ C18 are given in the middle distillate/methyl ester of fatty acid mixture.

The ratio of saturated C18/unsaturated C18 to the ratio of these esters in the mixture of fatty acid methyl esters.

Table III shows that it is possible to introduce more than 20% of a mixture of esters of vegetable oils into hydrocarbons of the diesel and heating oil type, providing that the stearic ester (sat C18) concentration is always below 1.2% by weight for a minimum deterioration of the filterability limit temperature (FLT) measured by application of the standard EN116 by increasing the temperature by 6° C. The FLT reactivity is not degraded and the increase remains at a level above 6° C. with respect to the mixture without additive. According to the case, it is possible to correct this deterioration by addition of a FLT additive based on EVA (polyethylenevinylacetate). However, the addition of EVA is effective only when the ratio by mass of [saturated C18s/sum of the unsaturated C18s] is kept below or equal to 9% mass, and particularly a level of (sat C16+C18) corresponding to the sum of the stearic and palmitic esters, always below 10% by weight in said fuel.

Example 2

In this example, apart from the cetane number and filterability characteristics of the mixtures in an EN590 type diesel, the oxidation stability characteristics of the mixtures are measured by the iodine number (IN) determined by standard EN14214. The description of these compositions is as follows (% by mass):

A=5SE+95EMC
B=40EMC+60EMP
C=30EMC+70EMP
D=70EMC+30EMP
E=8SE+92(EMC+EMS+EMP)
F=100EMC

These components A, B, C, D, E and F were added to the diesel in a proportion 20% component to 80% diesel by weight. The physico-chemical characteristics of these compositions are summarized in Table IV below.

TABLE IV

| Composition | FLT IN* | FLT +EVA | Cetane | SE/GO (% weight) | SE/EAG (% mass) |
|---|---|---|---|---|---|
| Diesel | | −16 | −21 | 51 | — | — |
| A | 110 | −13 | −19[b] | 52 | 1.34 | 7.6 |
| B | 82 | −9 | −13[a] | 54.5 | 1.16 | 7.95 |
| C | 76 | −9 | −13[b] | 55 | 1.33 | 9.34 |
| D | 99 | −9 | −19[a] | 53 | 0.76 | 4.6 |
| E | 107 | 0 | −2[b] | 53.8 | 1.94 | 9.7 |
| F | 116 | −13 | −20[a] | 51.6 | 0.36 | 1.94 |

*Iodine number of the diesel containing esters
[a]addition of 100 ppm EVA
[b]addition of 400 ppm EVA Examples A to D according to the invention satisfy the criteria of the ratio of stearic ester/unsaturated esters and oxidation stability, while still leading to compositions having good properties under cold conditions and an iodine number below 110.

The invention claimed is:
1. Diesel fuel characterized in that it comprises:
at least one hydrocarbon from distillates with a boiling point varying from 180 to 350° C.,
at least one component comprising at least one stearic ester chosen from the esters of linear or branched monoalcohols containing 1 to 6 carbon atoms:
a) in pure state, in a mixture with at least one ester of an unsaturated linear fatty acid having at least 18 carbon atoms, b) in pure state, added to a mixture of at least one ester of a vegetable or animal oil in crude or partially hydrogenated form, c) or included in a mixture of one or more esters of vegetable and/or animal oils in crude or partially hydrogenated form, the mixtures of saturated and unsaturated esters being such that the ratio by mass of the level of stearic ester(s) to the sum of the levels of unsaturated fatty acid esters present in the esters of animal or vegetable oils varies from 1 to 12%, the unsaturated fatty acid esters being esters of unsaturated mono- or polyacids containing at least 18 carbon atoms, and esters of monoalcohols, and the stearic acid ester level in said fuel being between 0.5 and 2.4% by mass.

2. Diesel fuel according to claim 1, characterized in that the ratio by mass stearic ester/sum of the esters of unsaturated acids present varies from 5 to 9.6% by weight.

3. Diesel fuel according to claim 1, characterized in that the stearic ester level varies from 0.5 to 1.2%.

4. Diesel fuel according to claim 1, characterized in that it comprises at least 10% by weight of the sum of the C16 and C18 saturated esters.

5. Diesel fuel according to claim 1, characterized in that it contains more than 10% by weight of a mixture of esters of vegetable and animal oils taken in combination.

6. Diesel fuel according to claim 1, characterized in that the fuel contains at least one cold filterability additive.

7. Diesel fuel according to claim 1, which has a low sulphur level.

8. Diesel fuel according to claim 1, wherein the stearic acid ester is chosen from methyl or ethyl esters, or from n-propanol, isopropanol, n-butanol or tert-butanol esters.

9. Diesel fuel according to claim 1, wherein, in the component containing esters of unsaturated fatty acids, the ratio by mass [stearic ester levels/sum of the levels of the ester(s) of unsaturated fatty acids] varies from 5 to 9.6%.

10. Diesel fuel according to claim 1, wherein the esters of unsaturated fatty acids present in the composition are esters of mono- or polyunsaturated acids, containing 18, 20 or 22 carbon atoms.

11. Diesel fuel according to claim 1, wherein the esters of unsaturated fatty acids form part of the group constituted by esters of oleic, linoleic or linolenic acids.

12. Diesel fuel according to claim 1, wherein the stearic acid ester or the esters of unsaturated fatty acids are of natural or synthetic origin.

13. Diesel fuel according to claim 1, wherein the stearic acid ester or the esters of unsaturated fatty acids have come from the transesterification of the triglycerides contained in the vegetable and/or animal oils.

14. Diesel fuel according to claim 1, wherein the component is constituted by a mixture of esters of vegetable oils chosen from methyl or ethyl esters of colza, palm, pine, soya, sunflower, tallow, maize, safflower, cotton, coriander, mustard and any other esters containing stearic esters and/or unsaturated esters having at least 18 carbon atoms.

15. Diesel fuel according to claim 1, wherein in the component containing esters of unsaturated fatty acids, the ratio by mass [stearic ester levels/sum of the levels of the ester(s) of unsaturated fatty acids] varies from 7 to 9.0%.

16. Diesel fuel according to claim 1, wherein the mixtures of saturated and unsaturated esters being such that the ratio by mass of [saturated C18 esters/sum of the unsaturated C18 esters] is below or equal to 9% by mass.

17. Diesel fuel according to claim 2, characterized in that the ratio by mass stearic ester/sum of the esters of unsaturated acids present varies from 7 to 9% by weight.

18. Diesel fuel according to claim 5, characterized in that it contains more than 20% by weight of a mixture of esters of vegetable and animal oils taken in combination.

19. Diesel fuel according to claim 7, which has a sulphur level of less than 500 ppm.

20. Diesel fuel according to claim 19, which has a sulphur level of less than 100 ppm.

* * * * *